United States Patent
Ku

(10) Patent No.: US 7,088,808 B2
(45) Date of Patent: *Aug. 8, 2006

(54) NETWORK ACCESS PAY TELEPHONE AND CONVERSION KIT

(76) Inventor: Li-Ta Ku, 6061 Woodfern Dr., Rancho Palos Verdes, CA (US) 90275

( * ) Notice: Subject to any disclaimer, the term of this patent is extended or adjusted under 35 U.S.C. 154(b) by 492 days.

This patent is subject to a terminal disclaimer.

(21) Appl. No.: 10/282,910

(22) Filed: Oct. 29, 2002

(65) Prior Publication Data

US 2003/0103609 A1 Jun. 5, 2003

Related U.S. Application Data

(63) Continuation-in-part of application No. 09/864,597, filed on May 23, 2001, now Pat. No. 6,480,590.

(51) Int. Cl.
*H04M 17/00* (2006.01)
(52) U.S. Cl. ............ 379/143; 379/144.05; 379/114.04; 379/146; 379/155
(58) Field of Classification Search ........ 379/143–155, 379/428.01, 433.01, 434, 440
See application file for complete search history.

(56) References Cited

U.S. PATENT DOCUMENTS

| | | |
|---|---|---|
| 5,133,005 A | 7/1992 | Kelley et al. |
| 5,168,518 A | 12/1992 | Criscenzo et al. |
| 5,425,088 A | 6/1995 | DeArkland |
| 5,430,797 A | 7/1995 | Hornsby |
| 5,694,456 A | 12/1997 | Carter et al. |
| 5,701,338 A | 12/1997 | Leyen et al. |
| 6,047,054 A | 4/2000 | Bayless et al. |
| 6,047,173 A | 4/2000 | Leyen et al. |
| 6,163,598 A | 12/2000 | Moore |
| 6,320,946 B1 | 11/2001 | Enzmann et al. |
| 6,370,242 B1 | 4/2002 | Speers et al. |
| 6,480,590 B1 * | 11/2002 | Ku .............................. 379/143 |

FOREIGN PATENT DOCUMENTS

WO 0062523 9/1999

OTHER PUBLICATIONS

"Bet you're wondering how I knew." brochure; Elcotel Telecommunications, Inc.; 5pp.
"Everyone needs a reliable source." brochure; Elcotel Telecommunications, Inc.; 5 pp.

(Continued)

*Primary Examiner*—Quoc Tran
(74) *Attorney, Agent, or Firm*—Denton L. Anderson; Sheldon & Mak PC

(57) ABSTRACT

A kit for converting an existing pay telephone to additionally provide computer network access includes an upper housing unit that latches to a lower housing of the existing telephone, and a network adapter unit which includes a network computer and a control module that selectively disables a hook switch connection to a payphone electronics module of the existing payphone. A coin scanner and an escrow unit of the existing payphone are connected through the control module to the payphone electronics unit. The network computer, in combination with the control module, provides a stand by mode, a pay phone mode, a data mode utilizing an optional data port socket for connection of an external data device, and a network mode. The kit provides for remote management of network functions as well as payphone functions over a single telephone line. Also disclosed is a complete network access pay telephone.

31 Claims, 7 Drawing Sheets

OTHER PUBLICATIONS

"Welcome to the 21st Century!" brochure; 2 pp.; 1997.
"Model 7000 Chassis" brochure; Protel Inc.; 4 pp.; 1999.
"Model 310 chassis" brochure; by Protel Inc.; 4 pp.; 1999.
Ascension Payphones: brochure; by Protel Inc.; 4 pp.; 1999.
"Smarter Solution—Eclipse" brochure; Elcotel Telecommunications; 2 pp.
"Smarter Solution—Series 5" brochure; Elcotel Telecommunications; 2 pp.
"Set yourself apart" ad; Protel, Inc.; 1 pp.; 2000.
"Introducting eMillenium—The Evolution of Public Access" ad; QuorTech Solutions; 1 pp.
"Product News—Elcotel" magazine article; Perspectives; 1 pp.; 1999.
"ACC Quality Parts, Complete Stock, Competitive Prices, Immediate Delivery" ad; Arctic Communications Company; 1 pp.

* cited by examiner

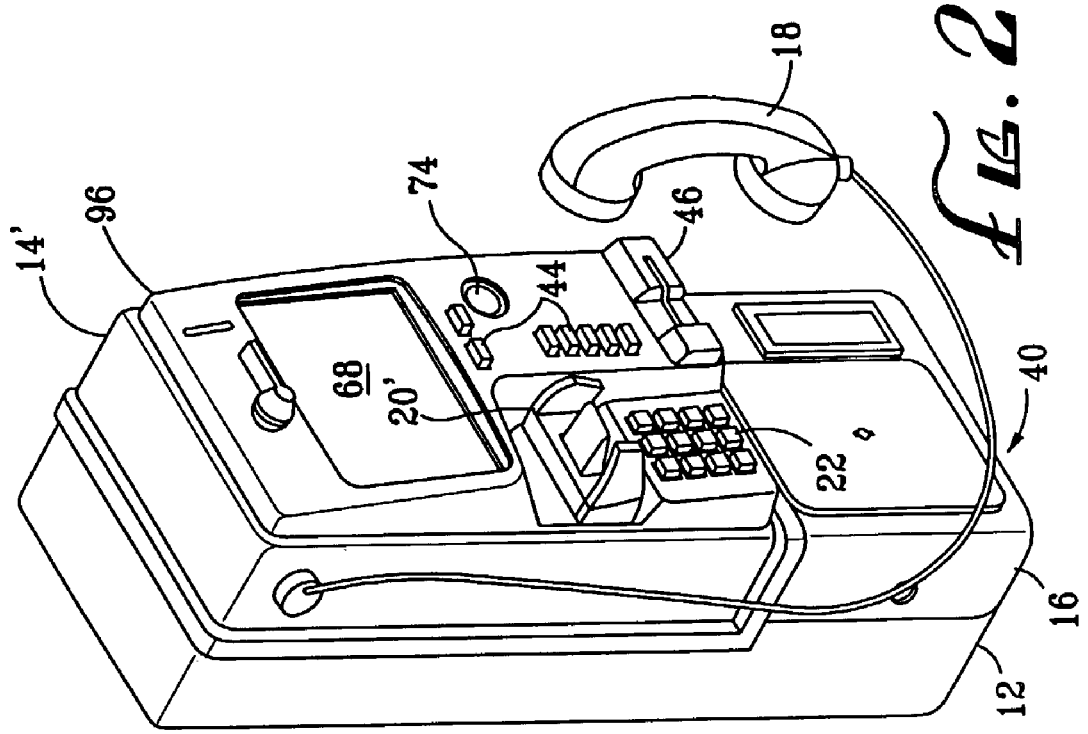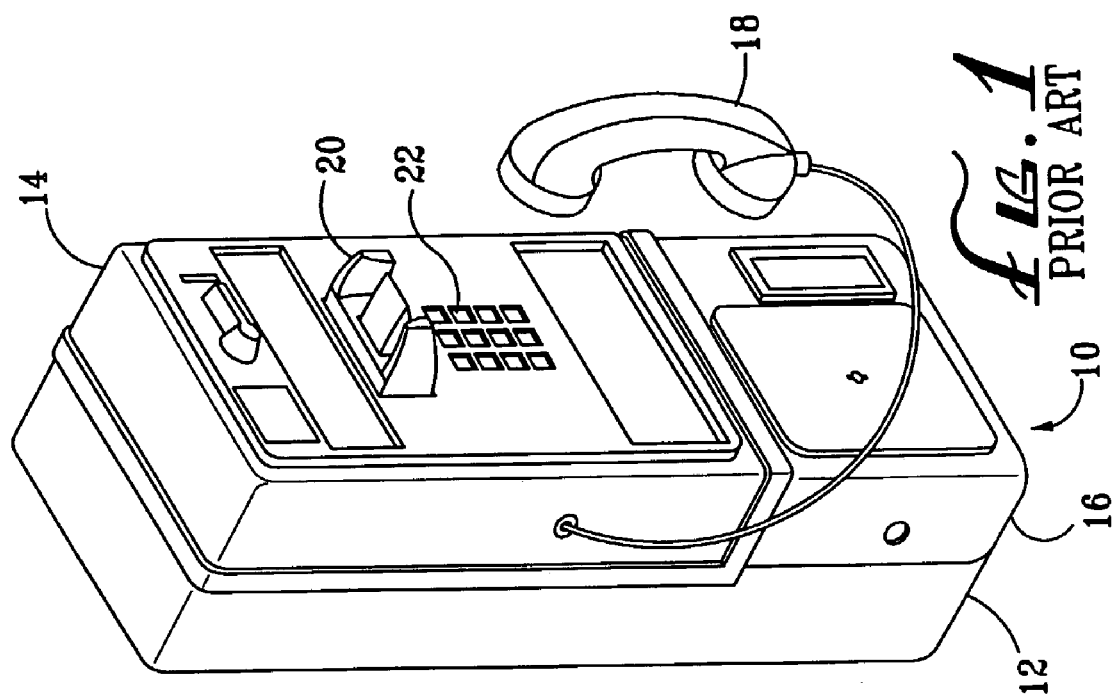

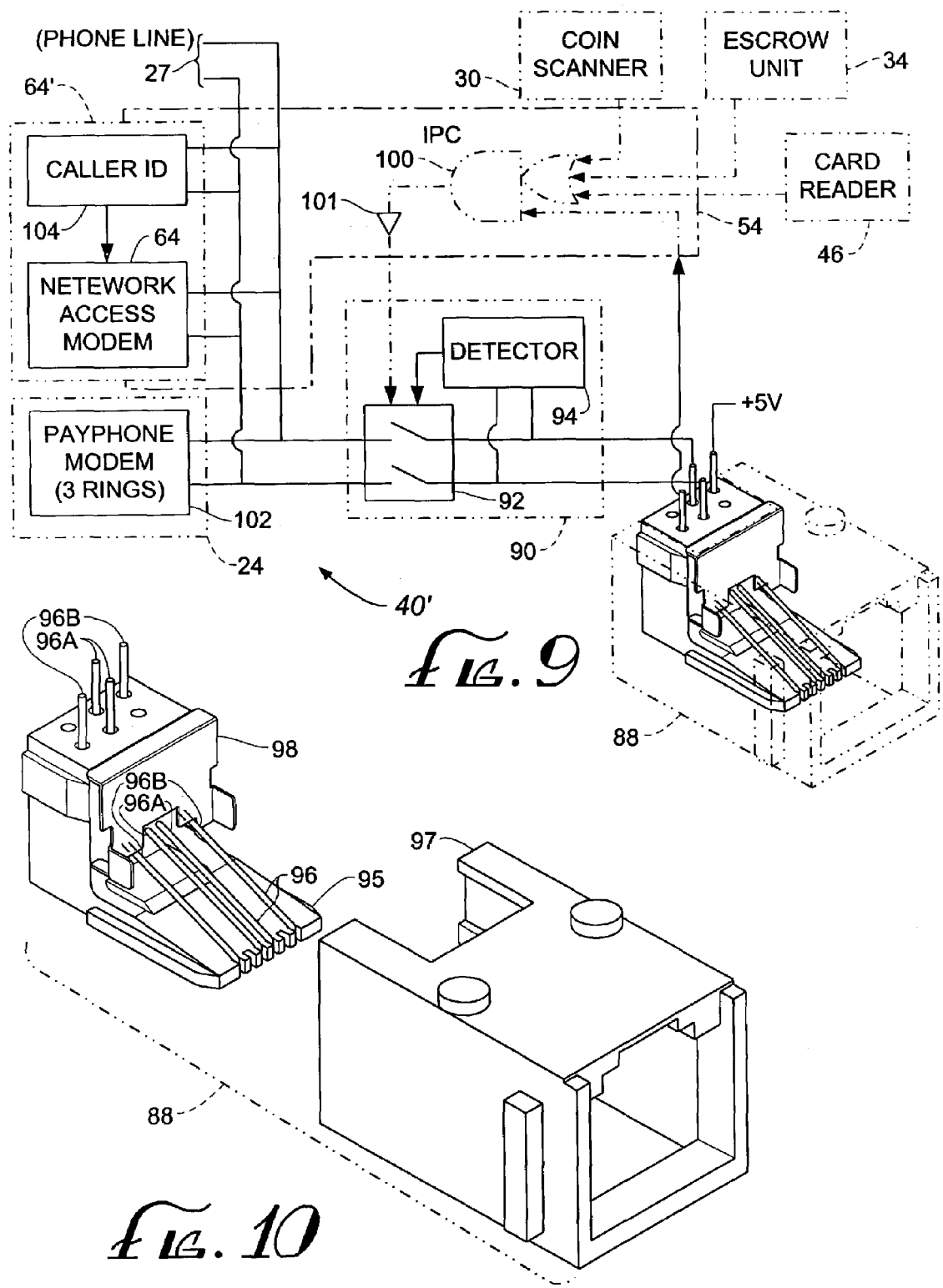

NETWORK ACCESS PAY TELEPHONE AND CONVERSION KIT

RELATED APPLICATION

This application is a continuation-in-part of application Ser. No. 09/864,597, filed on May, 23, 2000, now U.S. Pat. No. 6,480,590, which is incorporated herein by this reference.

BACKGROUND

The present invention relates to telephonic communications, and more particularly to pay phones that provide for computer network access.

Over the past 100 years, the public telecommunications industry, which has produced and operated what are commonly known as "payphones," has evolved into one of the most easy-to-use and widely accepted communications networks. The core device in public communications, the payphone, literally has made "on the go" communications possible for millions of people daily. In recent years, however, unprecedented technological, competitive and regulatory changes within the telecommunications industry have created an equally unprecedented challenge for the public communications sector. A decade previously, the payphone was the only way most people on the go kept connected to home or office. Now, however, wireless phones keep everyone—from high school students to housewives to business travelers—in touch while on the go, talking on the phone while walking down the street or through a busy airport.

The Internet likewise has revolutionized communications by replacing cards and letters with e-mail, by replacing in-person shopping with e-commerce, and replacing traditional access to news, information and other services with personalized portals. As a result, consumers increasingly demand access to "content" anytime, anywhere, and not just to the voice communications conventionally provided by landlines and wireless phones. Content equals information that includes voice calls, local news, mapped directions, investment updates, e-commerce transactions, email, and connectivity with the home, office and other web-based information.

Thus the single-function payphone is being driven toward a phase-out condition, and Internet kiosks are appearing in public places for use by those not having ready access to the Internet. Such persons include those not having a personal computer and/or an account with an Internet service provider (ISP). Also, many who have such accounts may wish to access the Internet while away from their home or office and, even if they are carrying a portable computer equipped for Internet access there may not be an available direct telephone line. Internet kiosks are relatively expensive to install when the required space is taken into account. Consequently, they are often installed in spaces previously occupied by pay telephones, which tends to diminish revenue otherwise received from pay telephone service, as well as to generate public dissatisfaction with reduced pay phone availability. As a result, pay phones are now marketed that provide Internet access in addition to conventional voice communication capability. However, these new pay phones are excessively expensive.

Thus there is a need for an inexpensive way to provide public computer network access without discontinuing pay telephone service at existing locations.

SUMMARY

The present invention meets this need by providing a network pay telephone that can be easily converted from a preexisting conventional pay telephone and includes a significant portion of the preexisting telephone, the inventive pay telephone being operable for both network and conventional voice communications. In one aspect of the invention, a network access pay telephone includes a housing structure supporting a coin scanner, an escrow unit, and a payphone electronics module, the payphone electronics module having a line connector for connecting an external telephone line, a coin scanner connection for electrically connecting the coin scanner, an escrow unit connection for electrically connecting the escrow unit, and an interface connection for electrically connecting an external interface, the payphone electronics module having circuitry for managing the conventional voice communications over the external telephone line in response to the coin scanner, the escrow unit, and signals into the interface connection; a front-end interface supported relative to the housing and adapted for feeding the signals to the interface connection of the payphone electronics module; a handset, a hook-switch, and a dialpad, each being supported relative to the housing and electrically connectable to the front-end interface; a network computer having non-volatile memory, a modem having a pass-through connection to the line connector of the payphone electronics module, a display, an input device, and a local interface port, the display and the input device being supported relative to the housing structure for operator access thereto; and a control module connected to the local interface port and to the front-end interface, the control module also having pass-through connections between the coin scanner and the payphone electronics module and between the escrow unit and the payphone electronics module. The control module and the network computer are implemented for enabling the network access in response to the input device and either one of the coin scanner and the local interface port. Thus payments for use of the data port can be by coins and/or credit card (when the local interface port is implemented as a credit card reader). Since the payphone electronics module can be a preexisting relatively expensive component of a conventional pay telephone, the inventive telephone can advantageously utilize such a device from inventory stock, or from a preexisting telephone.

Preferably the network pay telephone also includes a data port having an operator-accessible connection for connecting an external data device, including means for signaling the network computer in response to connection of the external data device, the network computer being further implemented for enabling communication between the data port and the external telephone line in response to the connection of the external data device and one of the coin scanner and the local interface port. The data port can have a data circuit portion and a sensor portion, the sensor portion being responsive to mechanical coupling of a mating counterpart of the data port to the data port for enabling the means for signaling the network computer that the external data device is actually connected. The means for signaling can include an electrical circuit having contacts in the data port that are opened in response to the mating counterpart being connected to or disconnected from the data port. The data port can have plural biasingly supported electrical contacts and a bridge contact, the data circuit portion including a first pair of the contacts, the sensor portion including a second pair of the contacts, the bridge contact shorting the second pair of the contacts unless the mating counterpart of the data port is coupled thereto.

The data port is preferably provided with a safety isolation circuit, including an isolation switch connected for selectively isolating and connecting the data circuit portion of the data port in response to an external signal, and a short-detector circuit for signaling the isolation switch for connecting the data circuit when there is a predetermined non-zero voltage at the data circuit portion. Thus the pay telephone is protected against loss of its other functions in the event that data port is subjected to a short-circuit such as might be caused by attempted connection of a faulty or improper external device.

The input device can include a pointing device, which can include a trackball. An alphanumeric keyboard is preferably provided in addition to the pointing device for facilitating network communications.

The network pay telephone can include a function keypad for signaling operator selections to the network computer, and/or a card reader for signaling machine-readable data to the network computer. The network computer can further include an audio output circuit, the telephone also having a speaker connected to the audio output circuit for sounding previously stored messages.

The network computer is preferably operative for providing a plurality of modes, including a stand by mode wherein the display is activated to show introductory information; a payphone mode wherein the display is activated initially to show dialing instructions upon an off-hook condition of the hook switch; and a network mode wherein the display is activated, in response to predetermined operator input other than the off-hook condition, to show further operator input options and responses thereto. The payphone mode is preferably disabled during the network mode for preventing inadvertent termination of a network operation; the network mode can also be disabled during the payphone mode. Preferably the stand by mode is entered upon termination of either the payphone mode or the network mode for resuming display of the introductory information.

In another aspect of the invention, the network access pay telephone can include the housing structure supporting the coin scanner, escrow unit, and payphone electronics module; the front-end interface; the handset, hook-switch, and dialpad, connectable to the front-end interface; the pass-through connection to the line connector; the data port; the means for detecting the presence of the external device connected to the data port; and the control module connected to the local interface port and to the front-end interface, the control module being implemented for enabling the data port in response to the coin scanner and the means for detecting to permit the external data device to access the network. Preferably the network pay telephone also includes the interface port, the control module being implemented for further enabling communication between the data port and the external telephone line in response to the local interface port (as a credit card reader, for example) and the means for detecting the presence of the external data device.

In another aspect of the invention, a kit for converting an existing pay telephone for network access as well as for conventional voice communications, includes an upper housing structure for coupling to a lower housing structure of the existing pay telephone, the upper housing structure including the front-end interface, a handset, a hook-switch, and a dialpad connected to the front-end interface, the front-end interface being electrically connectable to a payphone electronics module of the preexisting pay telephone, the electronics module being mounted in the lower housing structure with a coin scanner and an escrow unit; the data port, supported by the upper housing structure; the means for detecting the presence of the external data device; and the control module, implemented for enabling the data port in response to the means for detecting and the coin scanner. Preferably the kit also includes the network computer and associated network modem, the network computer and the control module being further implemented for enabling the data port in response to the means for detecting and the local interface port. The kit provides, in addition to the stand by, payphone, and network modes, a data mode wherein the display is activated initially in response to the means for detecting for requesting operator funding and, following payment, to indicate data port activation. Preferably the network modem has a caller ID circuit for permitting remote network management from predetermined locations, and remote payphone management from other locations after a predetermined number of rings.

DRAWINGS

These and other features, aspects, and advantages of the present invention will become better understood with reference to the following description, appended claims, and accompanying drawings, where:

FIG. 1 is a perspective view of a prior art pay telephone;

FIG. 2 is a perspective view as in FIG. 1, showing a network access pay telephone according to the present invention;

FIG. 7 is a flow chart showing operation of the network access payphone of FIG. 2;

FIG. 9 is a pictorial block diagram of a telephone line circuit portion of the network access pay telephone of FIG. 8; and FIG. 10 is a partially exploded view of a data socket portion of the network access pay telephone of FIG. 8.

DESCRIPTION

Figure 5:
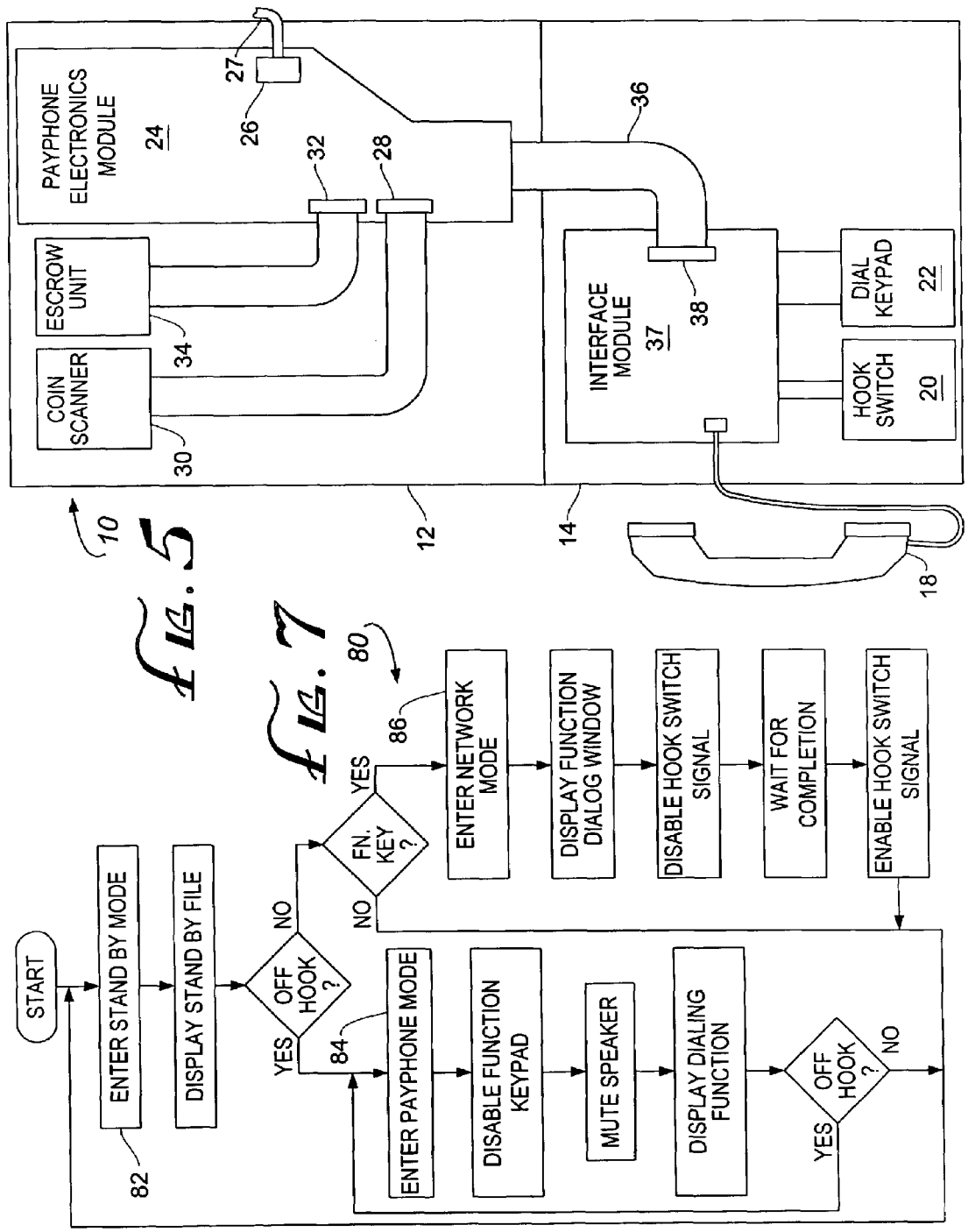
FIG. 5 is a pictorial block diagram of the prior art pay phone of FIG. 1.
Figure 6:
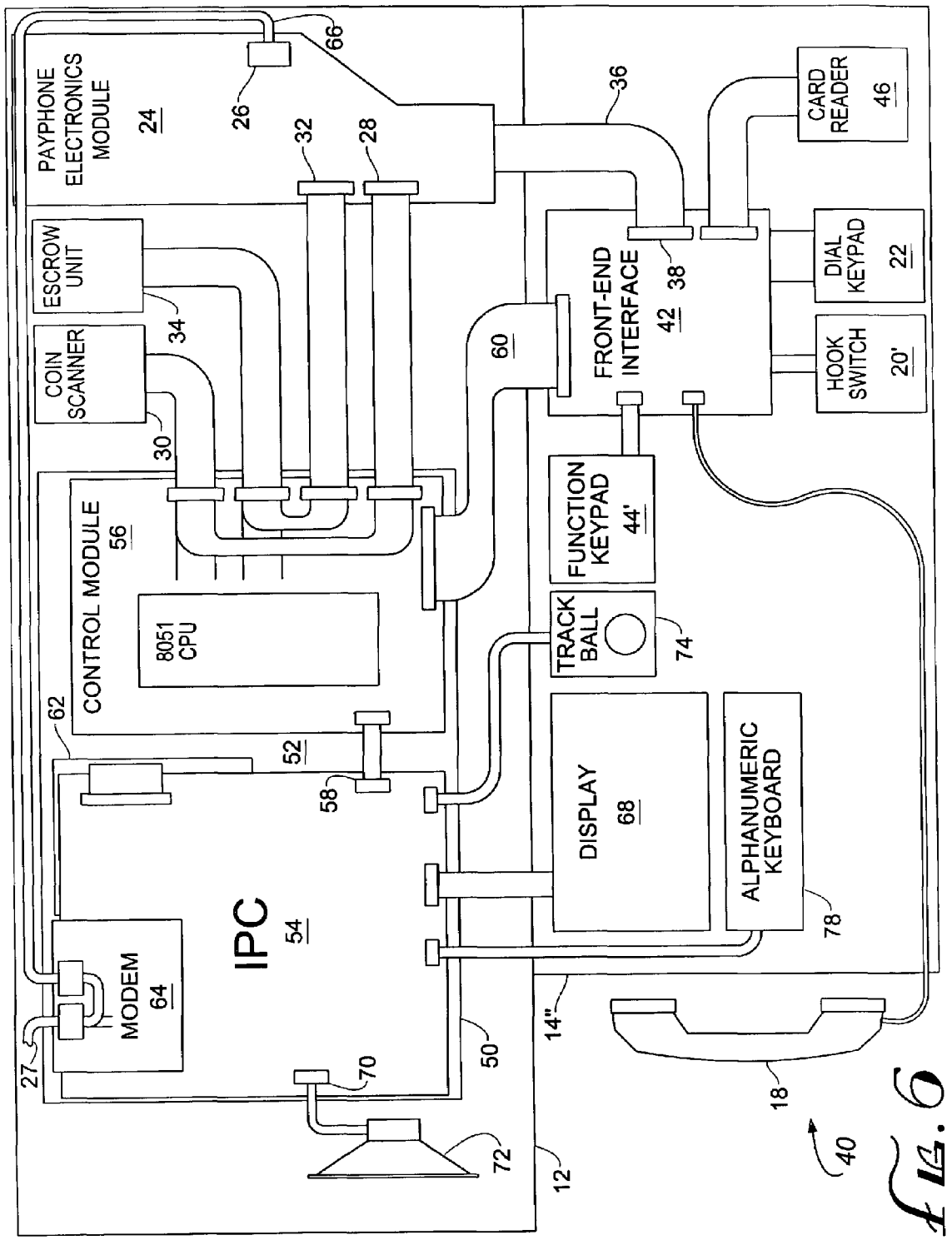
FIG. 6 is a pictorial block diagram of the network access payphone of FIG. 2.

The present invention is directed to a pay telephone that provides access to a computer network in addition to ordinary voice communications, that is particularly effective and easy to use, and that can be implemented as a conversion of existing pay telephones, incorporating substantial components thereof. With reference to FIGS. 1 and 5 of the drawings, a conventional prior art coin-operated pay telephone 10 includes a rear or lower housing 12 having an upper housing 14 securely latched thereto, and a coin receptacle unit 16 that is also secured to the lower housing 12. A handset 18 is tethered to the upper housing 14, which also supports a hook-switch 20 and a dial keypad 22. As shown in FIG. 5, a conventional payphone electronics module 24 is mounted within the lower housing 12, the module 24 having a line receptacle 26 for connecting an external telephone line 27, a coin scanner socket 28 to which is connected a coin scanner 30, an escrow unit socket 32 to which is connected an escrow unit 34, and an interface cable 36. The upper housing 14 supports an interface module 37 having an interface socket 38 for receiving the interface cable 36 of the payphone electronics module. The handset 18, the hook switch 20, and the dial keypad 22 are electrically connected to the interface module 37, and to the payphone electronics module 24 through the interface cable 36.

According to the present invention, and with reference to FIGS. 2, 3, 6 and 7, a network access pay telephone 40 includes the lower housing 12, the coin receptacle unit 16, the payphone electronics module 24, the coin scanner 30, and the escrow unit 34, which can be unmodified components of the conventional pay telephone 10 of FIGS. 1 and 5. The inventive pay telephone 40 also includes a counterpart of the upper housing, designated 14', having counterparts of the handset 18 and the dial keypad 22 attached thereto in a manner corresponding to the above-described conventional pay telephone 10. A counterpart of the hook switch, designated 20', corresponds to the hook switch 20 but preferably incorporates a two-pole switch element for electrical isolation of added circuit elements from circuitry of the payphone electronics module. The upper housing 14' also supports a counterpart of the interface module, designated front-end interface 42, having a counterpart of the interface socket 38, the handset 18, the hook switch 20, with the dial keypad 22 also being electrically connected to the front-end interface 42. Also mounted to the upper housing 14' (but not necessarily required) are a function keypad 44 and a card reader 46 for sensing machine-readable data from a credit card or other device (not shown) that may be possessed by a user of the pay telephone 40, the function keypad 44 and the card reader 46 being electrically connected to the front-end interface 42.

Figure 3:
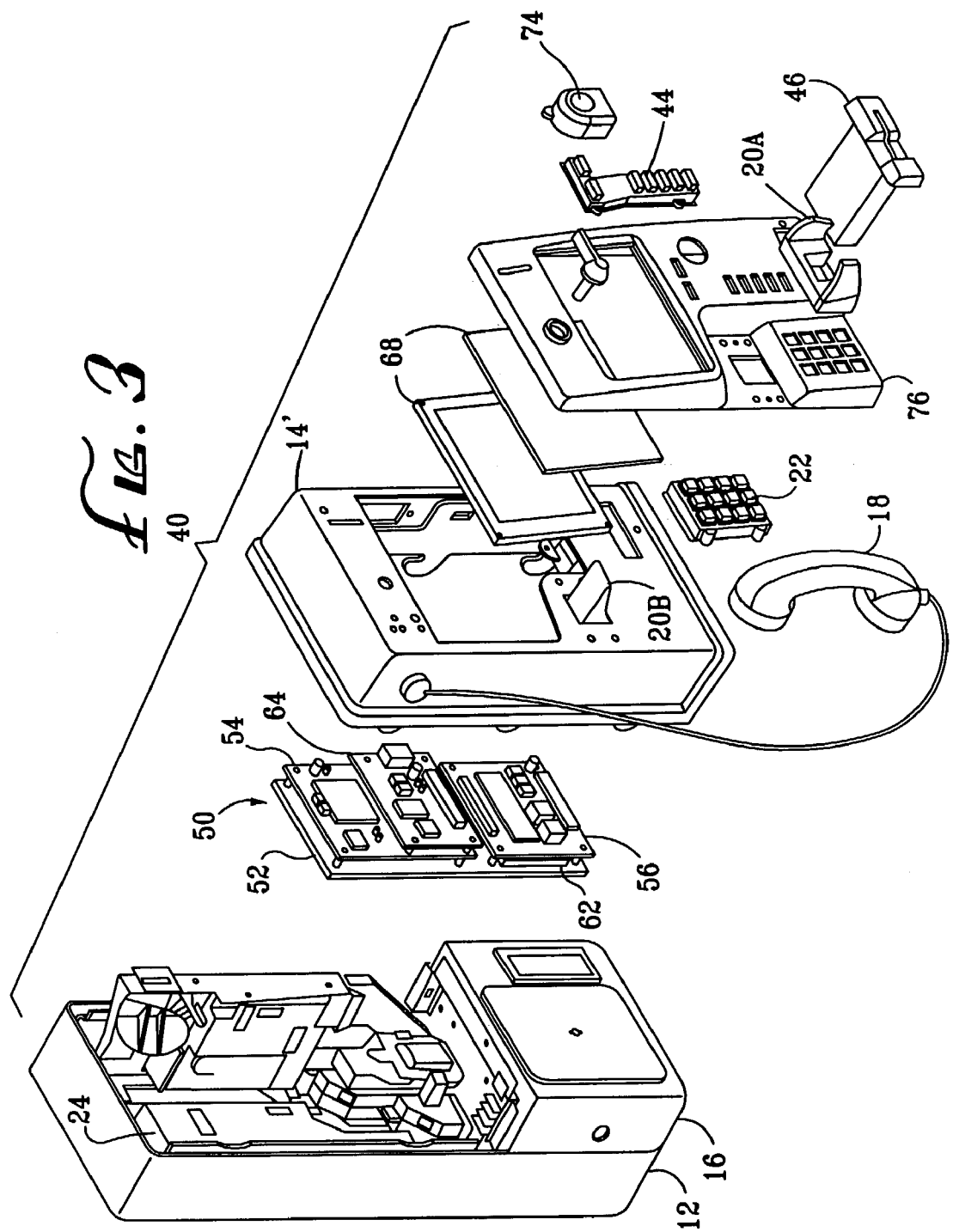
FIG. 3 is an exploded view of the network access pay telephone of FIG. 2.

The inventive pay telephone 40 also includes a network adapter unit 50 having a mounting base 52 as shown in FIG. 3 and including an Industrial Personal Computer (IPC) 54 and a control module 56 that is connected to a local (serial) interface port 58 of the IPC as shown in FIG., 6, a control cable 60 connecting the control module 56 to the front-end interface 42. The IPC 54 also has nonvolatile memory which can include a conventional hard disk drive 62, a modem 64 including a pass-through telephone line connection 66 in the form of a modular socket pair, an LCD panel display 68, an audio circuit output 70 having a speaker 72 connected thereto, and a pointing input device in the form of a trackball 74. In the exploded view of FIG. 3, the hook switch 20' is shown separated as a hook 20A and a switch actuator 20B, the LCD panel display 68 is combined with a protective cover, and the upper housing 14' has a front bezel cover 76. Other conventional components of the network pay telephone 40, such as a coin chute, coin release, housing latch, etc., are not shown or described in detail.

Figure 4:
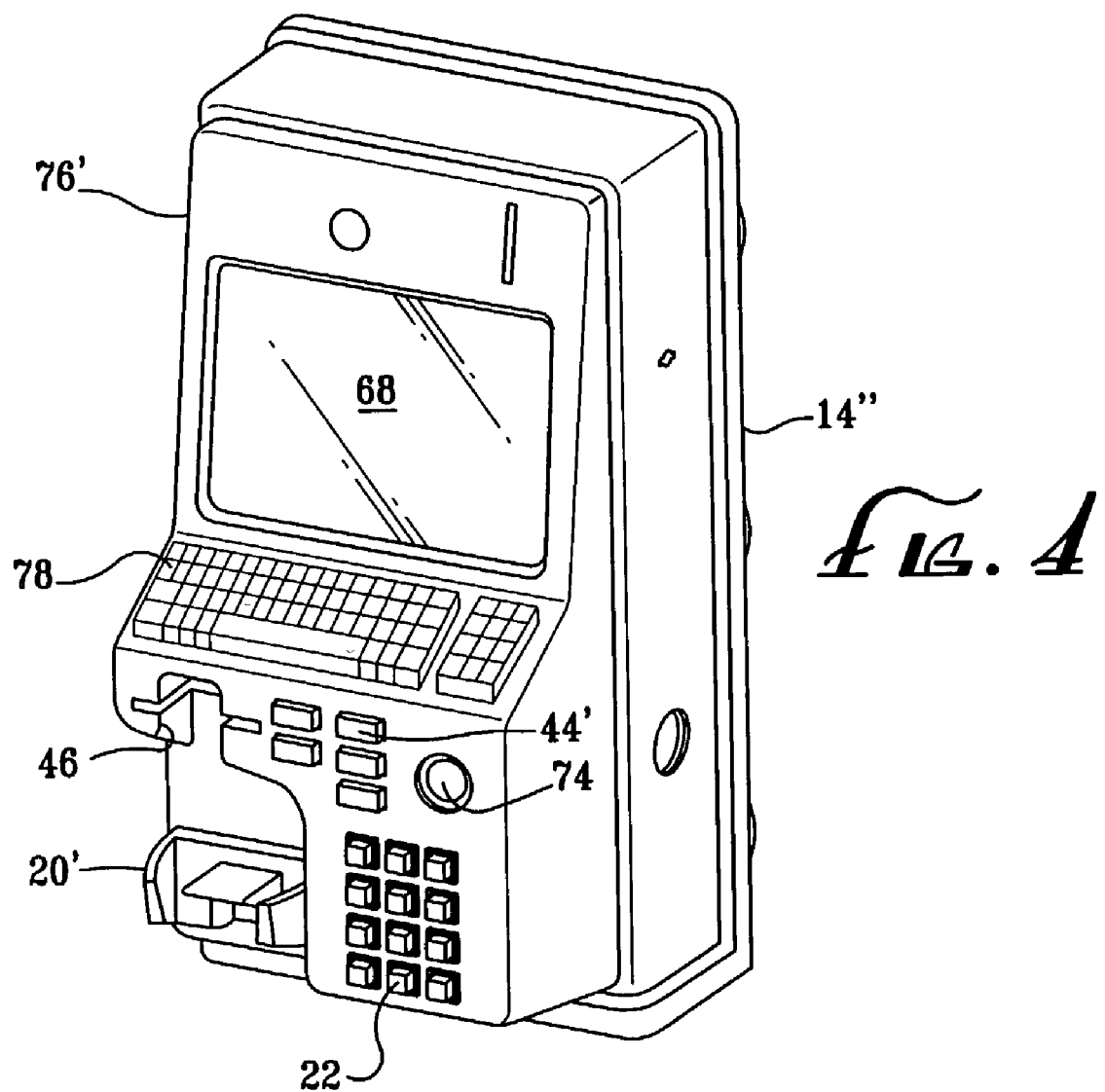
FIG. 4 is a perspective view as in FIG. 2, showing an alternative configuration of the network access pay telephone.

With further reference to FIG. 4, the payphone 40 has an alternative and preferred configuration of the upper housing, designated 14", and an alternatively configured bezel cover, designated 76', that supports a sloping alphanumeric keyboard 78 below the LCD display 68, the hook switch 20', the dial keypad 22, the card reader 46 being suitably relocated. Also, a rearranged counterpart of the function keypad, designated 44', has a reduced key complement in view of the availability of the alphanumeric keyboard 78 for operator input, the function keys provided being those most desirable to be prominently accessible. The keyboard 78 can be configured in a conventional manner, with a conventional device driver associated therewith in the IPC 54, except that some or all of conventional function keys (F1–F12, and the scroll-lock key) are omitted or disabled for preventing unauthorized user termination of application programs of the IPC. Thus it is possible to omit all of the function keys from the keyboard 68, with provision for a very limited subset thereof such as "Help" (F1) to be activated from the function keypad 44'. It will be understood that the block diagram of FIG. 5 includes the alphanumeric keyboard 78, which plugs into the IPC 54, the keyboard 78 being omitted in the configuration of the pay phone 40 that is shown in FIGS. 2 and 3.

A microcomputer implementation suitable for use as the IPC 54 is available as model Gene-4310 from Aaeon Technology, Inc., of Hsin-Tien City, Taipei, Taiwan. A modem board suitable for use as the modem 64 is available as PCM-5600, also from Aaeon Technology. A 6.4 inch LCD display suitable for use as the LCD panel display 68 is available as 6.4" TFT-LCD from Prime View International Co., Ltd., of Science-Based Industrial Park, Shinchu, Taiwan.

Operation of the network access pay telephone may be better understood with reference to FIG. 7, which shows a multiple mode process 80 having a stand by mode 82 wherein the LCD panel display 68 is activated to show a previously stored presentation, such a series of advertisements, in which audio messages are preferably played on the speaker 72. In the stand by mode 82, the function keypad 44 (or 44') is enabled and the hook switch 20' is repetitively tested for either an off-hook condition, which results in entry of a payphone mode 84; otherwise, a network mode 86 is entered upon detected activation of any key of the the function keypad 44. In the payphone mode, the function keypad 44 is disabled, the speaker 72 is muted, and the display is activated with conventional dialing instructions. In the network mode 86, the display 68 is activated with a dialog window corresponding to the particular key of the function keypad 44 that was pressed, and signals from the hook switch to the payphone electronics module 24 are disabled. When the activated function is completed (such as by user activation of a "Quit" function from the trackball 74 or an assigned function key), the hook switch signal to the payphone electronics module 24 is restored and control is passed to the stand by mode 82.

During the payphone mode 84, repetitive testing of the hook switch 20' is continued with the payphone electronics module 24 operating in a conventional manner until an on-hook condition is detected, upon which control is returned to the stand by mode (with re-enabling of the function keypad 44).

Figure 8:
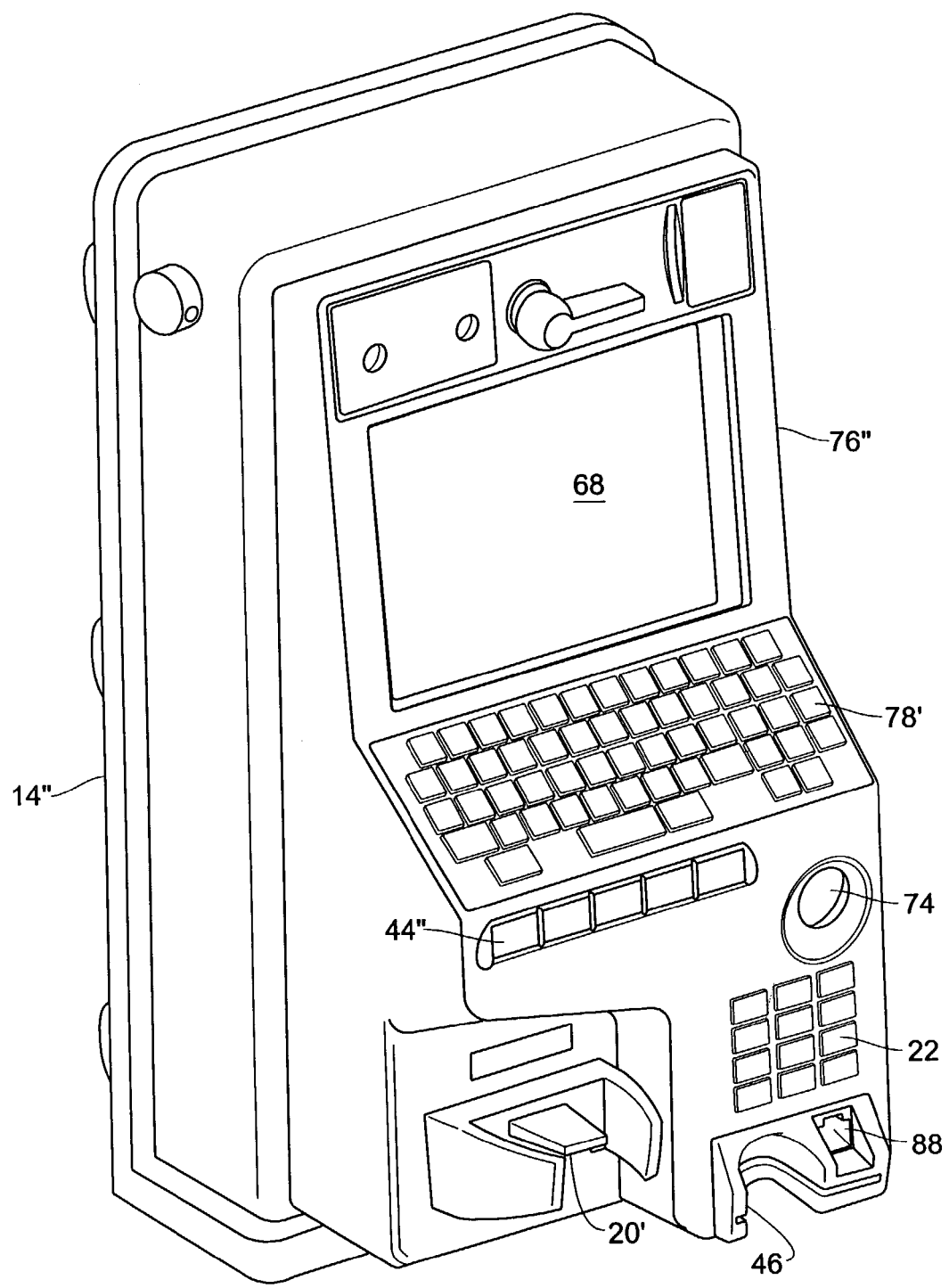
FIG. 8 is a perspective view as in FIG. 4, showing another alternative configuration of the network access pay telephone.

With further reference to FIGS. 8–10, another alternative and preferred configuration of the payphone, designated 40', includes the upper housing 14" and a counterpart of the bezel cover, designated 76", that supports a data port socket 88 for permitting network access by an external data device such as a user's laptop or notebook computer (not shown). In the exemplary configuration shown in FIG. 8, the bezel cover 76" also supports a reduced-key counterpart of the alphanumeric keyboard, designated 78'. As further shown in FIG. 8, an in-line counterpart of the function keypad, designated 44", is located below the keyboard 78', the dial keypad 22 and the trackball 74 are raised slightly, and the card reader 46 is located proximate the bottom of the bezel 76", the data port socket 88 being associated with the card reader 46.

As shown in FIG. 9, the data port socket 88 is connected to the telephone line 27 through a protection circuit 90 that includes an isolation switch 92 and a short-circuit detector 94 as further described below. As more clearly shown in FIG. 10, the data port socket 88 includes a molded base 95 that holds a plurality of electrical contacts 96, an end extremity of each contact being biasingly cantilevered for making contact with corresponding contacts of a mating connector (not shown) for communication with the external data device, the socket 88 also having a molded outer housing 97 that snaps over the base 95, being configured for holding the mating connector, which can be a conventional RJ-Series plug, RJ-11 being shown. A central first pair 96A of the contacts 96 form a data port data circuit portion. According to the present invention, a second pair 96B of the contacts, together with a bridge contact 98, form a data port sensor portion, the bridge contact 98 shorting the contacts 96B when a mating plug counterpart of the data port socket 88 is not engaged therewith. The bridge contact 98 is configured for being fixedly retained by the outer housing 97, the contact 98 clearing the first pair 96A of the contacts whether or not the mating plug counterpart is plugged in.

As further shown in FIG. 9, an exemplary implementation of the pay telephone 40' has one of the spring contacts 96B of the data port socket 88 connected to a positive (+5V) voltage source, the other contact 96B signaling the IPC 54. When the mating counterpart of the data port 88 is engaged, each of the contacts 96 is deflected away from the bridge contact 98, including the second pair 96B opening the +5V path to the IPC 54 for signaling the presence of the external data device. Initially upon occurrence of the open circuit signal, the IPC 54 generates a message to inform a user how to use the data port and how to pay for such use. The IPC 54 is programmed in a conventional manner to enable data transmission between the external data device and network destinations that are accessible over the telephone line 27 when a predetermined payment has been received. More particularly, the IPC 54 is responsive to the coin scanner 30, the escrow unit 34, and/or the card reader 46, in addition to the signal from the second contact pair 96B as indicated at 100 by logical ANDing of those inputs in FIG. 9 by means of appropriate firmware for determining proper payment prior to enabling the data circuit connection of the data port socket 88, and for metering continued enablement thereof. In one exemplary implementation of this feature, the IPC 54 controls a source or sink current source, designated source driver 101 in FIG. 9, from which the isolation switch 92 is driven, the inactive state of the switch 92 being that of isolation.

The short-circuit detector 94, which may be powered from the telephone line 27 or in any suitable manor known to those having skill in the art, can be configured as a voltage comparator circuit to operate the isolation switch 92 to disconnect the data port 88 from the telephone line 27 in case of a short-circuit across the first contact pair 96A of the data port socket 88. It will be understood that suitable implementations of the short-circuit detector 94 can utilize a high-impedance leakage path across the isolation switch 92 for producing a low but non-zero voltage across the first contact pair 96A even when the IPC 54 has not provided the source or sink current by which the isolation switch is activated to its conducting state.

As further shown in FIG. 9, an additional feature of the network access pay telephone 40' is the capability of independent remote management of both conventional payphone functions and for network access functions. The payphone electronics module 24 includes a payphone modem 102 for managing remote management software of the above-described conventional pay telephone 10. The modem 64 that is associated with the IPC 64 for network access also has remote management capability, in addition to its dial-up and fax functions. For both modems to receive data from different hosts separate telephone lines would ordinarily be required. However, the pay telephone 40' of the present invention provides these functions using only the single telephone line 27 as described herein. The payphone modem 102 is set for answering after a predetermined number of rings, such as three. The modem 64 is provided with a caller ID circuit 104 that can be set for answering calls originating from one or more associated remote management sites, after fewer than the predetermined number of rings for which the payphone modem 102 is set. Thus the modem 64 answers incoming calls from predetermined locations providing remote management of the IPC 54 and functions related thereto, but other incoming calls are ignored by the modem 64 and answered automatically after the predetermined number of rings by the payphone modem 102.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. A network access pay telephone for accessing a digital communications network as well as for conventional voice communications, comprising:
    (a) a housing structure supporting a coin scanner, an escrow unit, and a payphone electronics module, the payphone electronics module having a line connector for connecting an external telephone line, a coin scanner connection for electrically connecting the coin scanner, an escrow unit connection for electrically connecting the escrow unit, and an interface connection, the payphone electronics module having circuitry for managing the conventional voice communications over the external telephone line in response to the coin scanner, the escrow unit, and signals into the interface connection;
    (b) a front-end interface supported relative to the housing structure and being adapted for feeding the signals into the interface connection of the payphone electronics module;
    (c) a handset, a hook-switch, and a dialpad, each being supported relative to the housing structure and electrically connectable to the front-end interface;
    (d) a network computer comprising non-volatile memory, a modem having a pass-through connection to the line connection of the payphone electronics module, a display, an input device, and a local interface port, the display and the input device being supported relative to the housing structure for operator access thereto; and
    (e) a control module connected to the local interface port and to the front-end interface, the control module also having pass-through connections between the coin scanner and the payphone electronics module and between the escrow unit and the payphone electronics module, the control module and the network computer being implemented for enabling the network access in response to the input device and one of the coin scanner and the local interface port.

2. The network access pay telephone of claim 1, further comprising a data port having an operator-accessible connection for connecting an external data device, the operator-accessible connection having means for signaling the network computer in response to connection of the external data device, the network computer being implemented for enabling communication between the data port and the external telephone line in response to the connection of the external data device and one of the coin scanner and the local interface port.

3. The network access pay telephone of claim 2, wherein the data port comprises a data circuit portion and a sensor portion, the sensor portion being responsive to mechanical coupling of a mating counterpart of the data port to the data port for enabling the means for signaling the network computer.

4. The network access pay telephone of claim 3, wherein the means for signaling comprises an electrical circuit having contacts in the data port, the contacts being opened in response to one of the mating counterpart being connected to and disconnected from the data port.

5. The network access pay telephone of claim 4, wherein the data port comprises a plurality of biasingly supported electrical contacts and a bridge contact, the data circuit portion comprising a first pair of the electrical contacts, the sensor portion comprising a second pair of the electrical contacts, the bridge contact shorting the second pair of the contacts when the mating counterpart of the data port is not coupled to the data port.

6. The network access pay telephone of claim 3, further comprising a safety isolation circuit, comprising:
  (a) an isolation switch connected for selectively isolating and connecting the data circuit portion of the data port in response to an external signal; and
  (b) a short-detector circuit for signaling the isolation switch for connecting the data circuit when there is a predetermined non-zero voltage at the data circuit portion.

7. The network access pay telephone of claim 1, wherein the input device comprises a pointing device.

8. The network access pay telephone of claim 7, wherein the pointing device comprises a trackball.

9. The network access pay telephone of claim 7, wherein the input device is a first input device, the network computer further comprising a second input device being an alphanumeric keyboard supported by the upper housing structure.

10. The network access pay telephone of claim 1, further comprising a function keypad for signaling operator selections to the network computer.

11. The network access pay telephone of claim 1, further comprising a card reader for signaling machine-readable data to the network computer.

12. The network access pay telephone of claim 1, wherein the network computer further comprises an audio output circuit, the telephone further comprising a speaker connected to the audio output circuit.

13. The network access pay telephone of claim 1, wherein the network computer is operative in a plurality of modes, comprising:
  (a) a stand by mode wherein the display is activated to show introductory information;
  (b) upon an off-hook condition of the hook switch, a payphone mode wherein the display is activated initially to show dialing instructions; and
  (c) in response to predetermined operator input other than the off-hook condition, a network mode wherein the display is activated to show further operator input options and responses thereto.

14. The network access pay telephone of claim 13, wherein the payphone mode is disabled during the network mode.

15. The network access pay telephone of claim 13, wherein the network mode is disabled during the payphone mode.

16. The network access pay telephone of claim 13, wherein the stand by mode is entered upon termination of the payphone mode and the network mode.

17. A network access pay telephone for accessing a digital communications network as well as for conventional voice communications, comprising:
  (a) a housing structure supporting a coin scanner, an escrow unit, and a payphone electronics module, the payphone electronics module having a line connector for connecting an external telephone line, a coin scanner connection to the coin scanner, an escrow unit connection to the escrow unit, and an interface connection, the payphone electronics module having circuitry for managing the conventional voice communications over the external telephone line in response to the coin scanner, the escrow unit, and signals into the interface connection;
  (b) a front-end interface supported relative to the housing structure and being adapted for feeding the signals into the interface connection of the payphone electronics module;
  (c) a handset, a hook-switch, and a dialpad, each being supported relative to the housing structure and electrically connectable to the front-end interface;
  (d) a pass-through connection to the line connector of the payphone electronics module;
  (e) a data port having an operator-accessible connection supported relative to the housing structure for connecting an external data device;
  (f) means for detecting the presence of the external data device connected to the data port; and
  (g) a control module connected-to the local interface port and to the front-end interface, the control module also having pass-through connections between the coin scanner and the payphone electronics module and between the escrow unit and the payphone electronics module, the control module being implemented for enabling the data port in response to the coin scanner and the means for detecting to permit the external data device to access the network.

18. The network access pay telephone of claim 17, further comprising a local interface port, the control module being implemented for further enabling communication between the data port and the external telephone line in response to the local interface port and the means for detecting.

19. A kit for converting an existing pay telephone to a network access pay telephone for accessing a digital communications network as well as for conventional voice communications, the existing pay telephone comprising a lower housing structure having a coin scanner, an escrow unit, and a payphone electronics module mounted therein, the payphone electronics module having a line connection for connecting an external telephone line, a coin scanner connection for electrically connecting the coin scanner, an escrow unit connection for electrically connecting the escrow unit, and an interface connection, the payphone electronics module having circuitry for managing the conventional voice communications over the external telephone line in response to the coin scanner, the escrow unit, and signals into the interface connection, the kit comprising:
  (a) an upper housing structure comprising a front-end interface for electrically connecting the interface connection of the payphone electronics module, a handset connected to the front-end interface, a hook-switch connected to the front-end interface, and a dialpad connected to the front-end interface;

(b) a data port having an operator-accessible connection supported by the upper housing structure for connecting an external data device to the external telephone line using the line receptacle;

(c) means for detecting the presence of the external data device connected to the data port; and (d) a control module connected to the front-end interface, the control module also having pass-through connections for connecting between the coin scanner and the payphone electronics module and between the escrow unit and the payphone electronics module, the control module being implemented for enabling the data port in response to the means for detecting and the coin scanner.

20. The kit of claim 19, further comprising a network computer comprising non-volatile memory, an input device supported by the upper housing structure, a local interface port supported by the upper housing structure, and a network modem comprising the pass-through connection, wherein the network computer and the control module are further implemented for enabling the data port in response to the means for detecting and the local interface port.

21. The kit of claim 20, wherein the input device comprises a pointing device.

22. The kit of claim 21, wherein the pointing device comprises a trackball.

23. The kit of claim 20, wherein the input device comprises an alphanumeric keyboard supported by the upper housing structure.

24. The kit of claim 20, further comprising a function keypad for signaling operator selections to the network computer.

25. The kit of claim 20, wherein the local interface device comprises a card reader for signaling machine-readable data to the network computer.

26. The kit of claim 20, wherein the network computer further comprises an audio output circuit, the telephone further comprising a speaker connected to the audio output circuit.

27. The kit of claim 20, wherein the network computer is operative in a plurality of modes, comprising:

(a) a stand by mode wherein the display is activated to show introductory information;

(b) upon an off-hook condition of the hook switch, a payphone mode wherein the display is activated initially to show dialing instructions;

(c) in response to the means for detecting, a data mode wherein the display is activated initially to request operator funding and, following payment, to indicate data port activation; and (d) in response to predetermined operator input other than the off-hook condition and external connection to the data port, a network mode wherein the display is activated to show further operator input options and responses thereto.

28. The kit of claim 27, wherein the payphone mode is disabled during the network mode.

29. The kit of claim 27, wherein the network mode is disabled during the payphone mode.

30. The kit of claim 27, wherein the stand by mode is entered upon termination of the payphone mode, the data mode, and the network mode.

31. The kit of claim 20, further comprising a caller ID circuit for preventing the network modem from answering incoming calls other than from predetermined locations, thereby permitting the payphone electronics module, when so programmed, to answer after a predetermined number of rings.

* * * * *